United States Patent
Peters, II (10) Patent No.: US 7,599,896 B2
(45) Date of Patent: Oct. 6, 2009

(54) APPARATUS FOR MULTIPROCESSOR-BASED CONTROL OF A MULTIAGENT ROBOT

(76) Inventor: Richard Alan Peters, II, 1127 Winding Way, Nashville, TN (US) 37216-2213

(*) Notice: Subject to any disclaimer, the term of this patent is extended or adjusted under 35 U.S.C. 154(b) by 53 days.

(21) Appl. No.: 12/025,540

(22) Filed: Feb. 4, 2008

(65) Prior Publication Data

US 2008/0147691 A1    Jun. 19, 2008

Related U.S. Application Data (63) Continuation of application No. 10/749,326, filed on Dec. 31, 2003, now Pat. No. 7,328,196, which is a continuation of application No. 10/118,670, filed on Apr. 8, 2002, now Pat. No. 6,697,707.

(60) Provisional application No. 60/282,215, filed on Apr. 6, 2001, provisional application No. 60/311,932, filed on Aug. 13, 2001.

(51) Int. Cl.
*G06N 5/00* (2006.01)
(52) U.S. Cl. .................. 706/14; 700/17; 382/181

(58) Field of Classification Search .................. 706/14; 422/65; 382/181; 700/17
See application file for complete search history.

(56) References Cited

U.S. PATENT DOCUMENTS

| 5,875,108 A | * | 2/1999 | Hoffberg et al. | .............. 700/17 |
| 5,920,477 A | * | 7/1999 | Hoffberg et al. | ............ 382/181 |
| 5,985,214 A | * | 11/1999 | Stylli et al. | .................... 422/65 |

* cited by examiner

*Primary Examiner*—Wilbert L Starks, Jr.
(74) *Attorney, Agent, or Firm*—Morgan, Lewis & Bockius LLP (57) ABSTRACT

An architecture for robot intelligence enables a robot to learn new behaviors and create new behavior sequences autonomously and interact with a dynamically changing environment. Sensory information is mapped onto a Sensory Ego-Sphere (SES) that rapidly identifies important changes in the environment and functions much like short term memory. Behaviors are stored in a DBAM that creates an active map from the robot's current state to a goal state and functions much like long term memory. A dream state converts recent activities stored in the SES and creates or modifies behaviors in the DBAM.

4 Claims, 3 Drawing Sheets

APPARATUS FOR MULTIPROCESSOR-BASED CONTROL OF A MULTIAGENT ROBOT

CROSS REFERENCE TO RELATED APPLICATIONS

This application is a continuation of application Ser. No. 10/749,326 filed Dec. 31, 2003, now U.S. Pat. No. 7,328,196, which is a continuation of application Ser. No. 10/118,670 filed Apr. 8, 2002, now U.S. Pat. No. 6,697,707 which claims benefit from U.S. provisional application Ser. No. 60/282,215 filed on Apr. 6, 2001 and from U.S. provisional application Ser. No. 60/311,932, filed on Aug. 13, 2001.

STATEMENT REGARDING FEDERALLY SPONSORED RESEARCH

This invention was made in part with support from the Government through DOD Grant Nos. DASG600110001, DASG609910005 and NASA Cooperative Agreement NCC9-30-199. The Government has certain rights in the invention.

FIELD OF THE INVENTION

The present invention relates to the field of intelligent machines. More specifically, the present invention relates to the field of adaptive autonomous robots.

BACKGROUND OF THE INVENTION

While considered hubris by some, the fundamental urge to understand one's self and the surrounding universe, coupled with the technical challenge and the expected benefits of being able to do so, has motivated research in the direction of creating artificial life. One embodiment of artificial life is the adaptive autonomous robot. An autonomous robot is implicitly goal-directed and capable of operating completely on its own by considering its situation in its environment and deciding what actions to take in order to achieve its goals without human intervention. A robot is adaptive if it is capable of improving its ability to achieve its goals.

The task of building an adaptive autonomous robot is sufficiently complex that research groups have partitioned the problem into several more manageable tasks and have concentrated on solving each task independently of the others. Three tasks or behaviors are considered to be the most difficult in robotics; learning, planning, and world representation.

Initial efforts to implement these behaviors in robots were concentrated on building a complex program that processed environmental information from sensors and generated commands to actuators resulting in behaviors that resembled learning, planning, and abstraction (in order to represent the robot's world, or surroundings) in humans.

Although efforts to build a single, complex control program continue, many of the new and exciting advancements in robotics are based upon the rejection of the notion that complex behavior requires a complex control program. Instead, control is distributed to many interacting autonomous agents. Agents are small programs that act independently of other agents while interacting with the other agents. Complex behavior, such as learning or abstraction, emerge from the interaction of many independent agents rather than being controlled by any one agent.

Mataric and Brooks, "Learning A Distributed Map Representation Based on Navigation Behaviors," in "Cambrian Intelligence: the early history of the new AI," The MIT Press, 1999, demonstrated that complex behaviors, such as goal-directed navigation, could emerge from the interaction of simpler behaviors termed "reflexes." A reflex is an agent that couples an actuator signal to a sensor signal. For example, an avoid reflex may generate a signal to a wheel motor based on a signal from a proximity sensor. If the proximity sensor senses an object within a danger zone of the robot, the reflex generates a signal to stop the wheel motor. Mataric and Brooks showed that starting with only four reflexes, goal-directed navigation could emerge from their interaction. The reflexes, however, were not generated by the robot but required hand-coding by a programmer.

Pfeifer, R. and C. Scheier, "Sensory-motor coordination: the metaphor and beyond," *Robotics and Autonomous Systems, Special Issue on "Practice and Future of Autonomous Agents,"* vol. 20, No. 24, pp. 157-178, 1997 showed that signals from the sensors and actuators tended to cluster for repeated tasks and termed such clustering category formation via Sensory Motor Coordination ("SMC"). Cohen has shown that robots can partition the continuous data stream received from sensors into episodes that can be compared to other episodes and clustered to form an exemplar episode. An exemplar episode is representative of the cluster of several episodes and may be determined by averaging over the episodes comprising each cluster. The exemplar episode is self-generated (by the robot) and replaces the external programmer. As the robot is trained, the robot will identify a set of exemplar episodes that may be used to complete an assigned task. The ability of the robot to identify episodes from a continuous sensor data stream and to create "categories" (exemplar episodes) from the clustered episodes may be considered to be a rudimentary form of robotic learning.

In order to gather a sufficient number of episodes for the identification of categories, the robot must be trained. Training is normally accomplished by a reinforcement learning ("RL") technique as will be known to those skilled in the art. In one example of RL, the robot is allowed to randomly generate actions while a trainer rewards actions that move the robot toward a desired goal. The rewards reinforce the most recent actions of the robot and over time, episodes corresponding to the rewarded actions will begin to cluster as similar actions are rewarded similarly. The training, however, requires many repetitions for each action comprising the desired task. Therefore, there remains a need for a more efficient method of training a robot.

An autonomous robot must be able to select an action that will lead to or accomplish its desired goal. One known method for robot planning involves a spreading activation network ("SAN"), a set of competency modules ("CM") that, when linked together, initiate a sequence of commands that the robot may perform to accomplish the desired goal. A competency module includes information characterizing the state of the robot both before (state pre-conditions) and after (state post-conditions) a command to an actuator. Competency modules are linked by matching the state pre-conditions of one CM to the state post-conditions of another CM.

Planning begins by first identifying all terminal CMs, defined as CMs having state post-conditions corresponding to the state of the robot after accomplishment of the assigned goal. The state pre-conditions of each of the terminal CMs are then used to find other CMs having state post-conditions matching the state pre-conditions of the terminal CMs. The process is repeated until the state pre-conditions of a CM corresponds to the present state conditions of the robot.

In one method of searching for the shortest path to a goal, each CM is assigned an activation value determined by CMs in contact (matching endpoints) with the CM. The order of execution is determined by the activation value of each CM where the CM with the largest activation value is executed next.

As the number of CMs increases, the time required to complete the search increases very rapidly and the reaction time of the robot increases until the robot is unable to respond to the dynamic changes in its environment. While such a search may be acceptable for planning before beginning a task, the exponential increase of the search time as more CMs are added (i.e. as the robot learns) renders such a search unsuitable for real-time response to the robot's changing environment.

The back-propagation of CM linking creates an unavoidable delay in the robot's responsiveness because the robot cannot begin to execute the linked CMs until the complete chain of CMs taking the robot from its present state to the goal state are found. This unavoidable delay limits the operating environments of the robots to situations that are usually predicable.

Therefore there remains a need for an efficient method for robotic planning capable of reacting to sudden or dynamic situations in the robot's environment while allowing for the addition of CMs as the robot learns.

In robots, as well as humans, the amount of sensory information received greatly exceeds the processing capability of the robot. In order to function in any environment, a robot must be able to condense the voluminous sensor data stream to a data rate that its processors can handle while retaining information critical to the robot's operation. In one method of condensing the sensor data stream, the robot builds a representation of the robot's environment (the world model) and compares the received sensory information to the representation stored by the robot. The world model allows the robot to orient itself in its environment and allows for rapid characterization of the sensory data to objects in the world model.

The world model may be allocentric or may be ego-centric. An allocentric world model places objects in a coordinate grid that does not change with the robot's position. An ego-centric model is always centered on the present position of the robot. One example of an ego-centric model is described in Albus, J. S., "Outline for a theory of intelligence", *IEEE Trans. Syst. Man, and Cybern.*, vol. 21, no. 3, 1991. Albus describes an Ego-Sphere wherein the robot's environment is projected onto a spherical surface centered on the robot's current position. The Ego-Sphere is a dense representation of the world in the sense that all sensory information is projected onto the Ego-Sphere. Albus' Ego-Sphere is also continuous because the projection is affine. The advantage of the Ego-Sphere is its complete representation of the world and its ability to account for the direction of an object. The Ego-Sphere, however, still requires processing of the sensory data stream into objects and a filtering mechanism to distinguish important objects from unimportant objects. Furthermore, Albus does not disclose or suggest any method for using the Ego-Sphere to develop an action plan for the robot, nor is there a suggestion to link the Ego-Sphere to the learning mechanism of the robot.

Therefore, there remains a need to seamlessly interface the learning, planning, and representation tasks of a robot to allow for real-time responsiveness to a dynamic environment.

Citation or identification of any references in this Section or any section of this Application shall not be construed that such reference is available as prior art to the present invention.

SUMMARY OF THE INVENTION

One embodiment of the present invention is directed to an architecture for robot intelligence comprising: a sensory database comprising at least one record, each record representing a direction from the robot and capable of storing a sensor signal; a behavior database comprising a least one record, each record representing a behavior capable of being performed by the robot; an attention agent for identifying a focus record in the sensory database; and a behavior agent for selecting a behavior from the behavior database, the selection based, in part, on the focus record.

Another embodiment of the present invention is directed to an adaptive autonomous robot situated in an environment, the robot comprising: an actuator; a sensory processing unit; a short term memory module containing a representation of the environment centered around the robot, the representation based on data provided by the sensory processing unit; a long term memory module containing a behavior, each behavior comprising a command to the actuator, a sensory pre-condition, and a sensory post-condition; an active mode wherein the actuator is responsive to the actuator command from a behavior, the behavior selected such that the sensory post-condition of a preceding behavior is linked to the sensory precondition of the behavior; and a dream mode wherein the actuator is disabled and a new behavior is added to the long term memory module based, in part, on the data provided by the sensory processing unit and on the behaviors stored in the long term memory module.

Another embodiment of the present invention is directed to a data structure stored on a computer-readable medium, the data structure representing a behavior in an adaptive autonomous robot performing a task, the robot characterized by a state vector, the state vector comprised of at least one sensor signal and at least one actuator signal, the data structure comprising: a pre-condition state vector representing a state of the robot; a post-condition state vector representing a state of the robot after the pre-condition state vector; an activation term characterizing the data structure; a link to another data structure, the another data structure characterized by a pre-condition state vector that is distinct from the post-condition state vector of the data structure; and a link probability based, in part, on the pre-condition state vector of the another data structure and on the post-condition state vector of the data structure.

Another embodiment of the present invention is directed to a method for training an adaptive autonomous robot to perform a task, the robot configured to sense a state of the robot and the environment surrounding the robot, the method comprising the steps of: completing the task by teleoperation; recording the robot's sensory information during teleoperation; identifying an episode based on the recorded sensory information; creating an exemplar episode based on at least one episode; creating a behavior, the behavior comprising the exemplar episode and a link to a succeeding behavior such that the execution of the linked behaviors complete the task without teleoperation.

Another embodiment of the present invention is directed to a method of locating an object previously identified by an autonomous robot moving in an environment, the method comprising the steps of: storing the object and the direction of the object relative to the robot; recording the movement of the robot after the object is identified; calculating the direction of the object based on the stored data structure and the recorded movement of the robot; and locating the object by storing a tag in a short term memory according to the calculated direction of the object.

Another embodiment of the present invention is directed to a method of creating new behavior sequences in an adaptive autonomous robot, the robot comprising an actuator, a short term memory module, and a long term memory module, the long term memory module including at least one behavior, the behavior including an actuator command and a sensory state vector, the method comprising the steps of: disabling the actuator; creating a new behavior based on the contents of the short term memory module; and forming a link between the new behavior and an existing behavior stored in long term memory based on the sensory state vector of the new behavior and the sensory state vector of the behavior stored in long term memory.

Another embodiment of the present invention is directed to a data structure stored on a computer-readable medium representing short term memory of an intelligent robot immersed in an environment and receiving a stimulus from the environment, the data structure comprising: a first field representing a direction; a nearest neighbor list representing a pointer to a nearest neighbor direction; and an event list including a pointer to an event data structure, the event data structure representing the stimulus received from the direction stored in the first field.

Another embodiment of the present invention is directed to a method of identifying an event occurring in an environment surrounding an autonomous robot having a sensory processing module, each module configured to sense a characteristic of the environment, the event characterized by an event heading relative to the robot, the method comprising the steps of: receiving from each module a signal representing the characteristic sensed by the module and a direction of the sensed characteristic; storing each module signal in a short term memory according to the direction of the module signal; identifying the event based on the module signal stored in the short term memory corresponding to the direction of the event heading.

Another embodiment of the present invention is directed to an adaptive autonomous robot comprising: means for interacting with the environment; means for sensing an internal state of the robot; means for sensing a characteristic of the environment; a sensory ego sphere for representing an object based on the sensed internal state and the sensed environment; means for receiving data from an external source; and means for representing the received data on the sensory ego sphere.

BRIEF DESCRIPTION OF THE FIGURES

The present invention may be understood more fully by reference to the following detailed description of the preferred embodiment of the present invention, illustrative examples of specific embodiments of the invention and the appended figures in which:

FIG. 1b is a diagram showing a left sensor signal, right sensor signal, and motor state during the time period shown in FIG. 1a.

DETAILED DESCRIPTION OF THE PREFERRED EMBODIMENTS

An adaptive autonomous robot must be capable of sensing and interacting with its environment. Therefore, a robot must include sensors and actuators. A sensor is any device capable of generating a signal that can be mapped to a characteristic of the environment. A sensor may be a proprioceptive sensor that measures an internal aspect of the robot such as, for example, the angle formed by two members at a joint or the angular speed of a motor shaft. A sensor may be an exteroceptive sensor that measures an aspect external to the robot such as, for example, the intensity of light from a direction or the presence of a force applied to the robot. An actuator is any device enabling the robot, in whole or in part, to perform an action. In addition to sensors, actuators, and mechanical support structures, a robot must have one or more computers capable of receiving signals from the sensors, transmitting commands to the actuators, and executing one or more programs. The present invention may be implemented on robots having various combinations of sensors, actuators, and computers. One such robot is described in Peters, R. A. II, K. Kawamura, D. M. Wilkes, K. E. Hambuchen, T. E. Rogers, and A. Alford "ISAC Humanoid: An Architecture for Learning and Emotion," *Proceedings of the IEEE-RAS International. Conference on Humanoid Robots*, pp. 451-459, Waseda University, Tokyo, Japan, 22-24 Nov. 2001 herein incorporated by reference in its entirety. Another example of such a robot is described in R. Ambrose, S. Askew, W. Bluethmann, and M. Diftler, "A Humanoid Designed to Do Work," *Proceedings of the IEEE-RAS International. Conference on Humanoid Robots*, Waseda University, Tokyo, Japan, 22-24 Nov. 2001 herein incorporated by reference in its entirety. In a preferred embodiment, the present invention is implemented on a machine architecture enabling the execution of many independent agent programs asynchronously interacting with each other. An example of such an architecture is described in Pack, R. T., "IMA: The Intelligent Machine Architecture," Ph. D. Dissertation, Vanderbilt University, May, 1999, hereby incorporated by reference in its entirety.

Figure 1A:
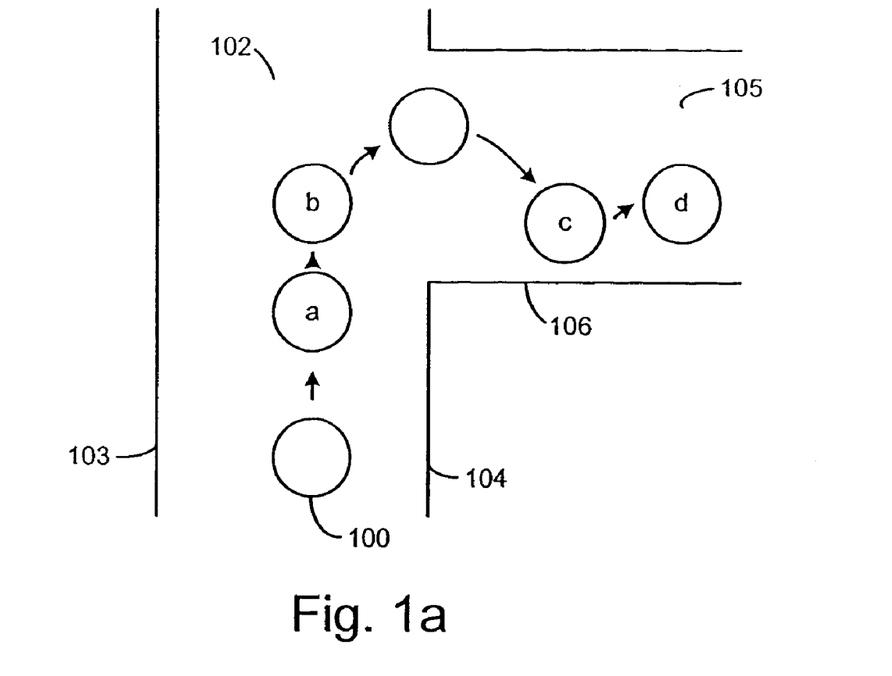
FIG. 1a is an illustrative diagram of one embodiment of the present invention traveling in a corridor.
Figure 1B:
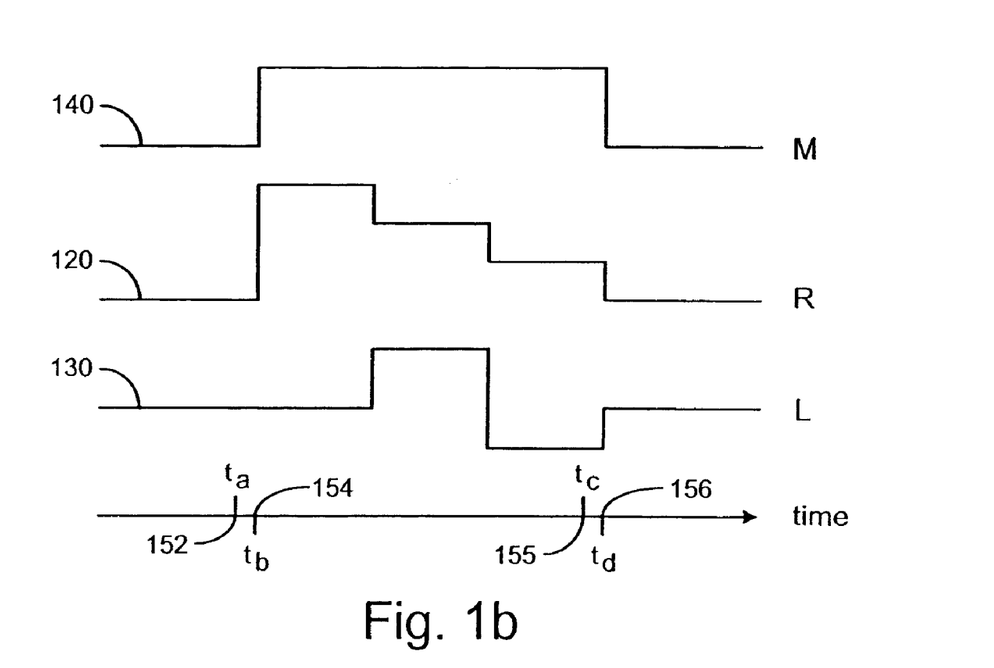

The physical state of the robot may be described by an (S+A)-dimensional state vector, R(t), where S is the dimensionality of the robot's sensor data and A is the dimensionality of the robot's actuator controllers. As an illustration of the use of the state vector, FIG. 1a is a diagram of a robot 100 traveling down corridor 102 and making a right turn into another corridor 105. FIG. 1b shows the robot's right sensor signal 120, the left sensor signal 130, and one of the robot's actuator (motor) signals 140 during the time period illustrated in FIG. 1a. At time, $t_a$ 152, the robot is traveling down corridor 102 while maintaining a constant distance from the far wall 103 of the corridor 102 and a constant distance from the near wall 104 of the corridor 102. The state vector at $t_a$ is comprised of the values of all the sensors and actuators associated with the robot at $t_a$. Although FIG. 1b shows only one motor signal and two sensor signals associated with the robot, the state vector also includes the values of the other sensor and actuator signals at $t_a$. At time, $t_b$ 154, the robot passes the entrance to corridor 105 and the robot's right sensor signal changes as the distance to the near wall suddenly increases. At the same time, the motor to the left wheel increases its speed to begin turning the robot into corridor 105. The motor maintains its increased speed until at time, $t_d$ 156, the robot has re-established a constant distance to the right wall 106 of corridor 105.

Although a human may understand the meaning of the phrase, "making a right turn into another corridor" in the above illustration, the only information accessible to the robot is the state vector, R(t). Furthermore, while a human can easily partition the acts of traveling down a corridor, making a right turn, and traveling down a second corridor, the robot must be able to partition the continuous R(t) into discrete episodes. Boundaries separating consecutive episodes may be identified by identifying times when an actuator transitions to another state. Such an actuator transition may be correlated to sudden changes in one or more of the robot's sensors as described in Cohen, Paul R., Niall Adams and David Hand, "Finding Patterns that Correspond to Episodes," University of Massachusetts Computer Science Department Technical Report 01-11, 2001. In FIG. 1*b*, one episode boundary corresponds to the time, $t_b$ 154, when the wheel motor speeds up to begin turning the robot whereas the second episode boundary corresponds to the time, $t_d$ 156, when the wheel motor returns to its normal speed for traveling down a corridor. The period between the episode boundaries is defined as an episode.

As the robot performs additional right turns, the state vectors corresponding to the right turn will trace paths in state space that appear to cluster. The cluster may be reduced to a single path through state space, also referred to as the exemplar episode, by any appropriate methods known to one of skill in the art such as, for example, temporal normalization followed by averaging. Alternative methods for determining the exemplar episode are described in Cambron, M. E., and Peters II, R. A., "Determination of Sensory Motor Coordination Parameters for a Robot Via Teleoperation", *Proceedings of the* 2000 *IEEE International Conference on Systems, Man and Cybernetics*, Tucson, Ariz., October 2001 herein incorporated by reference in its entirety. The exemplar episode represents, in one sense, an abstraction of all the clustered episodes into a single entity.

The abstraction, or categorization, of several episodes into a single exemplar is significant because the exemplar episode contains information on the sensors and actuators that are significant for the particular episode. Using the right turn episode as an example, the right and left sensor state and the wheel motor state are significant elements in the state vector because they will behave similarly for all right turns. Conversely, other sensors or actuators on the robot may be in any state during the right turn. For example, the robot may have a grasping arm and associated actuators and sensors that characterize the state of the arm. During training, the robot may make right turns while grasping an object but may also make right turns without grasping an object. The sensor and actuator signals associated with the arm will follow a different path through state space and when the episodes are analyzed, the correlation between episodes for the arm sensors and actuators will be small. Distinguishing significant state vector elements from the irrelevant state vector elements may not be important for categorizing episodes but can be used to advantage in increasing the responsiveness of the robot in a dynamic environment.

While it may be tempting to say that the robot has "learned" how to make a right turn, it would be misleading because the robot has no concept of what a "right turn" means. Instead, the robot has identified a state vector time series, the exemplar episode, that frequently occurs. Conversely, if the robot controls its actuators to match the actuator transitions in the exemplar episode, the robot will be capable of autonomously moving from the state at the beginning of the exemplar episode to the state at the end of the exemplar episode.

Instead of defining an episode, or the associated exemplar episode, as the period between episode boundaries, a preferred partition of the state vector time series begins the episode just prior to the first episode boundary at time, $t_a$ 152 and ends the episode just prior to the second episode boundary at time, $t_c$ 155. The slight shift in the episode has no effect on the identification of episode boundaries, clustering of episodes or on the creation of the exemplar episode. The small shift, however, creates a big advantage for the robot in planning tasks and reacting to the environment.

The episode begins at time, $t_a$ 152 and the state vector at $t_a$, $R(t_a)$, is called the episode pre-conditions because $R(t_a)$ describes the robot state (the state of the robot's sensors and actuators) at the beginning of the episode. The episode ends at $t_c$ 155 and the state vector at $t_c$, $R(t_c)$, is called the episode post-conditions. Defining the pre-condition state at $t_a$ is advantageous because the pre-condition state vector, $R(t_a)$, may be used as a trigger to execute the actuator state transition in the episode. Furthermore, the post-condition state vector, $R(t_c)$ may be used as a trigger to execute another episode. The exemplar episode defined by the pre- and post-condition states is the same as the basic behaviors described by Mataric and Brooks with one significant difference. The basic behaviors of Mataric and Brooks must be coded by an external programmer prior to any autonomous activity by the robot whereas the exemplar episodes of the present invention are created by the robot, without external intervention, from the robot's experience.

During the creation of the exemplar episode, the continuous state vector is partitioned into a series of discrete episodes where the pre-conditions of an episode equals the post-conditions of the previous episode and the post-conditions of the episode equals the pre-conditions of the succeeding episode.

Once identified (learned), each exemplar episode is stored in the long term memory module of the robot and can be recalled and executed (controlling the actuators to match the actuator transitions in the episode) independently of the other exemplar episodes. Given a goal, the robot may plan a path through state space by finding a series of exemplar episodes that begin at the robot's current state and end at the goal state where the pre-condition endpoint of each exemplar episode in the chain is matched to the post-condition endpoint of the preceding exemplar episode and the post-condition endpoint of each exemplar episode in the chain is matched to the pre-condition endpoint of the succeeding exemplar episode.

The linking of exemplar episodes from an initial state to a goal state is similar to the backward propagation of competency modules (CM) within a SAN used in classical AI planning. The CM includes a pre-condition list, a post-condition list, a command or action, and an activation term. The CM is also provided by a programmer prior to any robot activity.

In order handle both long term planning and rapid response to the changing environment, a preferred embodiment of the present invention represents a modified exemplar episode, referred to as a behavior, as a data structure. In one embodiment, the behaviors are stored as records in a database. Each behavior is partitioned into fields containing objects or pointers to objects. In a preferred embodiment, each behavior includes a field representing an exemplar episode (including the pre-condition state vector and the post-condition state vector). Each behavior may also include a field representing an activation term for the behavior. In a preferred embodiment, each behavior includes one or more fields, where each field represents a link to another behavior that is "close" to the behavior.

The link fields are one of the features of the behavior data structure that distinguish the behavior data structure from the CMs of prior art and enables the robot to respond quickly to changes in its environment. Link fields are advantageous because they allow the robot to execute a behavior that is not coincident in state space to the preceding behavior. It should be understood that "coincident in state space" means the matching of the post-condition state vector of the preceding behavior to the pre-condition state vector of the succeeding behavior. The capability of the robot to select a behavior that does not correspond to its present state gives the robot a greater selection of possible behaviors while at the same time weighting the behaviors such that the selected behavior has the greatest chance of successfully advancing the robot toward its goal.

Figure 2:
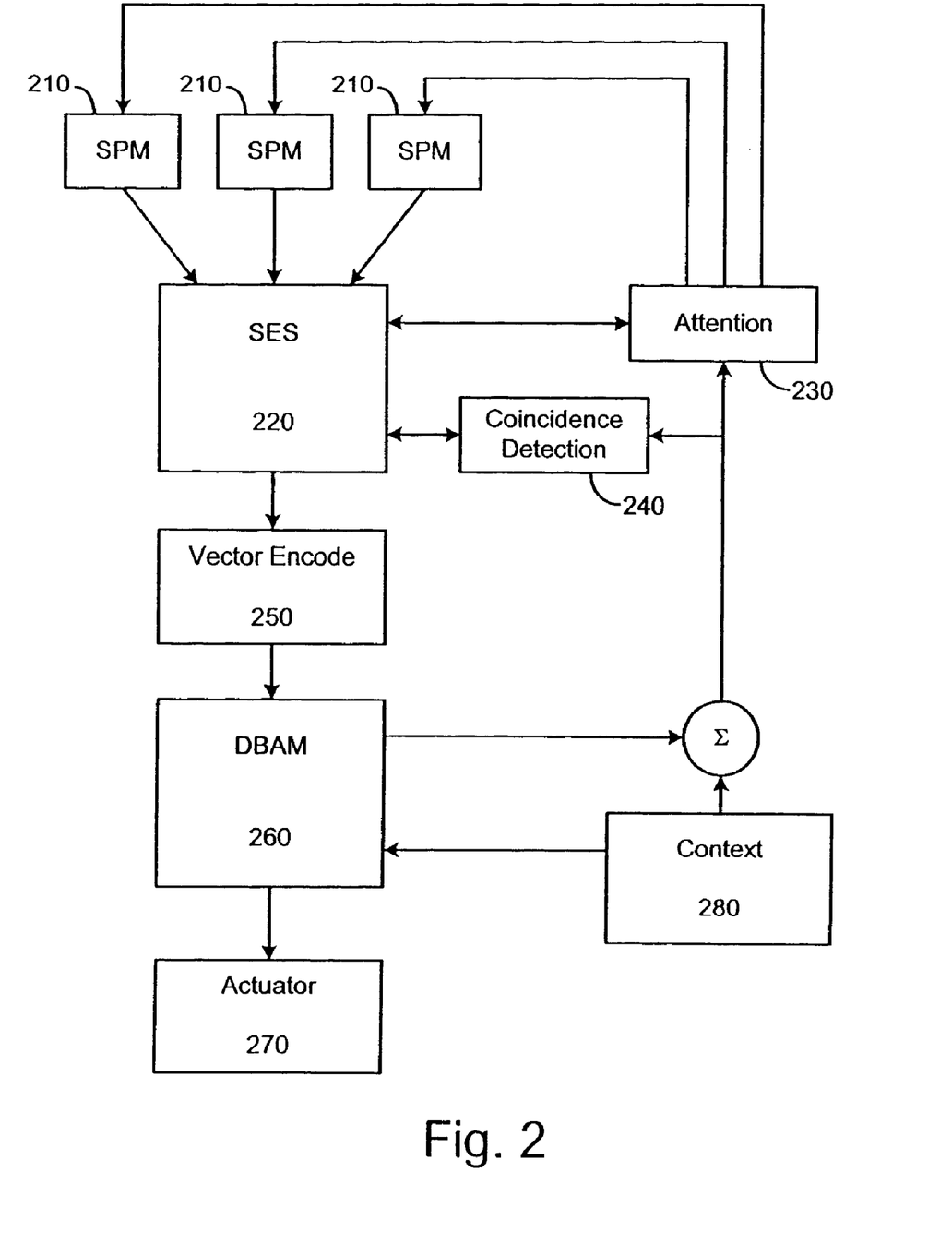
FIG. 2 is a schematic diagram showing the system architecture of one embodiment of the present invention.

FIG. 2 is a schematic diagram showing the system architecture of one embodiment of the present invention. In FIG. 2, sensory processing module (SPM) 210 provides information about the robot's environment to the Sensory EgoSphere (SES) 220. The SES 220 functions as the short term memory of the robot and determines the current state of the robot from the information provided by the SPM 210 and determines a focus region based on the information provided by the SPMs 210, attention agent 230, and coincidence agent 240. The vector encoding agent 250 retrieves the data associated with the focus region from the SES 220 and maps the data to a state space region in the database associative memory (DBAM) 260.

If the robot is in an active mode, such as performing a task, the DBAM 260 activates a Spreading Activation Network (SAN) to plan a series of actions, also referred to as an active map, for the robot to perform in order to achieve the assigned goal. Each action is executed as a behavior stored in the DBAM 260, the DBAM functioning much like a long term memory for the robot. The appropriate behavior according to the active map is retrieved from the DBAM 260 and executed by an actuator 270. The actuator 270 includes controls to control an actuator on the robot that causes the robot to act on the environment through the actuator. The DBAM also provides the robot's current state information to the attention agent 230 and coincidence agent 240.

The context agent 280 provides information relating to the operating context of the robot received from a source external to the robot. In a preferred embodiment, the context agent 280 provides for three general operating contexts; tasking, training, and dreaming. In the tasking context, the context agent 280 sets the task goal as received from the external source. In the training context, the context agent 280 may route all tele-operation commands received from the external source through the DBAM to the actuators. In the dreaming context, the context agent 280 may disable the actuators and activate the DBAM to modify and create behaviors based on the robot's most recent activities maintained by the SES 220.

Each module is comprised of one or more agents acting independently of each other and are now described in detail.

Each SPM 210 is associated with a sensor and writes sensor specific information to the SES 220. The robot's sensors may be internal or external sensors. Internal sensors measure the state or change-in-state of devices internal to the robot. Internal sensors include joint position encoders, force-torque sensors, strain gauges, temperature sensors, friction sensors, vibration sensors, inertial guidance or vestibular sensors such as gyroscopes or accelerometers, electrical sensors for current, voltage, resistance, capacitance or inductance, motor state sensors such as tachometers, clocks or other time meters, or other transducers known to one of skill in the art. These sensors could also be informational measuring, for example, the status of computational modules, the activities of computational agents or the communications patterns between them. The success or failure of tasks can be "sensed" informationally to add to an internal affect measurement.

External sensors are energy transducers. They are stimulated by energy incident from outside of the robot and convert the incident energy into an internal (to the robot) energy source (electrical, mechanical, gravitational, or chemical) that can be either sampled and quantized by the robot for abstract representation or used directly to feed other sensors or to drive actuators. External sensors include still image, motion picture (video) cameras either color or monochrome, infrared, optical, ultraviolet or multi-spectral, non-imaging light sensors sensitive to various wavelengths, microphones, active range finders such as SONAR, RADAR, or LIDAR, proximity sensors, motion detectors, haptic arrays such as, for example, touch sensors in artificial skin, thermometers, singly or in arrays, contact sensors (feelers), bump sensors, olfactory or chemical sensors, vibration sensors, global positioning system (GPS) sensors, magnetic field sensors (including compasses), electrical field sensors, and radiation sensors. External sensors may also be informational receiving communications signals (radio, TV, data), having direct internet connections, or connections to other robots. External sensors may have computational aspects that interpret speech, gestures, facial expressions, tone and inflection of voice.

Each sensor may be associated with one or more SPMs and each SPM may process one or more sensors. For example, an SPM may process the signals from two microphone sensors to determine the direction of a auditory source. In another example, a camera may send its signal to a SPM that only identifies a strong edge in a visual field and the same signal to another SPM that only identifies the color red in the visual field.

Each actuator 270 includes an actuator control that controls an actuator on the robot. Actuators may be any device that causes the robot to act on its environment or change the relative orientation of any of the robot's parts. Actuators perform work and may be driven by any conceivable energy source such as electrical, pneumatic, hydraulic, thermal, mechanical, atomic, chemical, or gravitational sources. Actuators include motors, pistons, valves, screws, levers, artificial muscles, or the like as known to one of skill in the art. Generally, actuators are used for locomotion, manipulation, or active positioning or scanning of sensors. Actuators may refer to groups of actuators performing a coordinated task such as arm or leg movement, or in active vision systems.

Actuator controls are normally activated by the robot's behavior agents that execute a sequence of behaviors during a task. During training, actuator controls may be activated by a handler external to the robot and is referred to as tele-operation.

The SES 220 facilitates the detection of events in the environment that simultaneously stimulate multiple sensors. Each sensor on the robot sends information to one or more SPMs 210 designed to extract specific information from the data stream associated with that sensor. The SPMs are independent of each other and run continuously and concurrently on preferably different processors. Each SPM 210 sends information messages to the SES manager agent which stores the data, including directional sensory information if available, in the SES. Each message received by the SES manager is given a time stamp indicating the time at which the message was received.

The SES 220 eliminates the necessity of processing the entire spherical projection field to find items of interest. Processing the entire projection field is very time consuming and decreases the robot's ability to respond quickly to dynamic changes in its environment. Significant events are quickly identified by the SES 220 by identifying the most active areas of the SES 220. Processing resources are only used to identify objects at the most active areas and are not wasted on uninteresting or irrelevant areas of the projection field. Furthermore, the SES 220 is able to fuse or associate independent sensor information written to the same vertex at little additional cost (in terms of computing resources) because each SPM 210 writes to the SES 220 independently of each other.

In one embodiment, the spherical surface centered on the robot upon which the three dimensional environment is projected onto, is represented in the SES as a set of vertices. The vertices are distributed uniformly over the spherical surface such that nearest-neighbor distances for each vertex are roughly the same. Discretization of the continuous spherical surface into a set of vertices enables the SES agents to quickly associate independent SPM information based on the direction of each sensor source. The selection of the size of the SES (the number of vertices) may be determined by one of skill in the art by balancing the increased time delay caused by the larger number of vertices against the highest angular resolution of the robot's sensors. In a preferred embodiment, the vertices are arranged to match the vertices in a geodesic dome structure.

Figure 3:
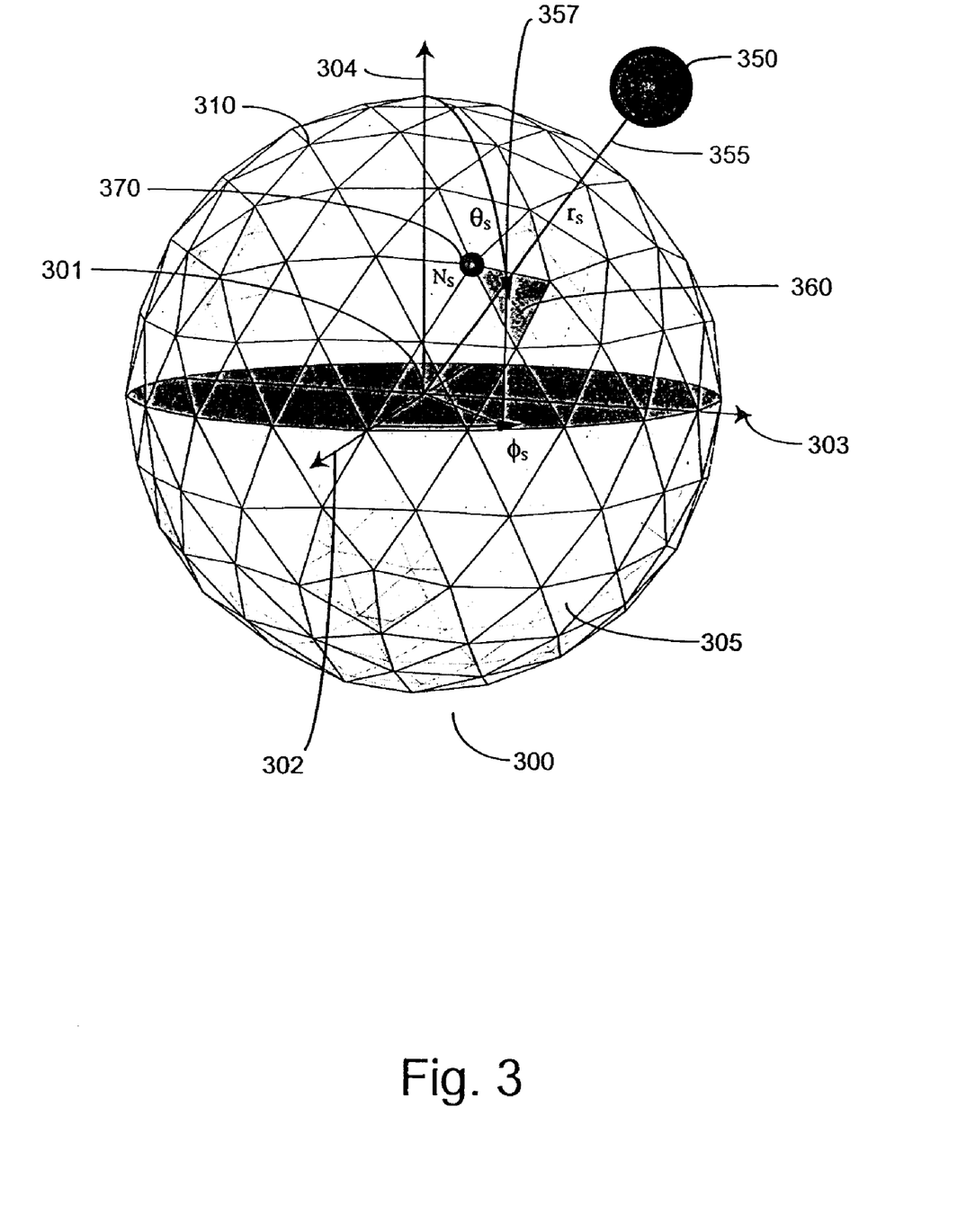
FIG. 3 is an illustrative diagram of one embodiment of the present invention.

FIG. 3 is an illustrative diagram of one embodiment of the present invention. In FIG. 3, the SES is represented as a polyhedron 300. The polyhedron 300 is comprised of planar triangular faces 305 with a vertex 310 defining one corner of the face. In the polyhedron of FIG. 3, each vertex has either five or six nearest-neighbor vertices and nearest-neighbor distances are substantially the same although tessellations producing a range of nearest-neighbor distances are also within the scope of the present invention. The SES is centered on the current location of the robot, which is located at the center 301 of the polyhedron. Axis 302 defines the current heading of the robot, axis 304 defines the vertical direction with respect to the robot, and axis 303, along with axis 302 define the horizontal plane of the robot.

An object 350 is projected onto the SES by ray 355 connecting the center 301 to the object 350. Ray 355 intersects a face 360 at a point 357 defined by azimuthal angle, $\phi_s$, and polar angle, $\theta_s$. Information about the object 350, such as $\phi_s$ and $\theta_s$ are stored at the vertex 370 closest to point 357.

In one embodiment, the SES is implemented as a multiply-linked list of pointers to data structures each representing a vertex on the tessellated sphere. Each vertex record contains pointers to the nearest-neighbor vertices and an additional pointer to a tagged-format data structure (TFDS). The TFDS is a terminated list of objects; each object consisting of an alphanumeric tag, a time stamp, and a pointer to a data object. The tag identifies the sensory data type and the time stamp indicates when the data was written to the SES. The data object contains the sensory data and any function specifications such as links to other agents associated with the data object. The type and number of tags that may be written to any vertex is unrestricted.

The SES may be implemented as a database using standard database products such as Microsoft Access® or MySQL®. An agent to manage communications between the database and other system components may be written in any of the programming languages, such as Basic or C++, known to one of skill in the art.

In one embodiment, the database is a single table that holds all registered information. The manager communicates with other agents in the control system and relays the requests generated to the database. The manager can receive one of four types of requests from any agent: post data, retrieve data using data name, retrieve data using data type and retrieve data using location. The post function takes all relevant data from the requesting agent and registers these data in the database at the correct vertex location. Relevant data includes data name, data type and the tessellation frequency at which the data should be registered. The vertex angles are determined by the SES according to the pan and tilt angles at which the data was found. Also, a time stamp is registered with the relevant data. The retrieve data using data name function queries the database using the specified name. This query returns all records in the database that contain the given name. All data is returned to the requesting agent. The retrieve data using data type function is like the previous function, but the query uses the data type instead of name. The retrieve data using location function determines the vertices to query from using the specified location and the neighborhood depth in which to search. When all vertices are determined, the query is placed and all records at the specified vertices are returned.

In another embodiment, the database consists of two tables wherein a vertex table holds the vertex angles and their indices and a data table holds all registered data. When the SES is created, the manager creates the vertices for the projection interface. Each vertex in the vertex table holds an azimuth angle, an elevation angle, and indices uniquely identifying each vertex. The manager communicates with outside agents of the control system and relays the requests generated to the database. The manager can receive one of four requests from any agent: post data, retrieve data using data name, retrieve data using data type and retrieve data using location. The post function takes all relevant data from the requesting agent and registers this data in the database at the correct vertex location. The retrieve data using data name function queries the database using the specified name. This query returns all records in the database that contain the given name. All data is returned to the requesting agent. The retrieve data using data type function is similar to the retrieve data using data name function but the query uses the data type instead of name. The retrieve data using location function uses the indices and angles stored in the vertex table. The desired location specified in the request is converted into a vertex on the SES. The indices for this vertex are located, and all indices failing within the desired neighborhood of the initial location are collected. The angles matching these indices are then used in a query to the main database holding registered data. All information at these locations is returned to the requesting component.

In addition to post and retrieve agents, other agents may perform functions such as data analysis or data display on the information stored in the SES through the use of the post and retrieve agents.

As each SPM agent writes to a vertex on the SES, an attention agent 230 searches through the vertex list to find the most active vertex, referred to as the focus vertex. High activity at a vertex, or a group of vertices, is a very rapid method of focusing the robot to an event in the environment that may be relevant to the robot without processing the information in all the vertices of the SES first. In one embodiment of the present invention, the attention agent identifies the focus vertex by finding the vertex with the highest number of SPM messages.

In a preferred embodiment, the attention agent 230 weights the information written to the SES, determines an activity value of each message based, in part, on the currently executing behavior, and identifies the focus vertex as the vertex with the highest activation value. If the currently executing behavior terminates normally (the post-condition state is satisfied), the attention agent should expect to see the post-condition state and can sensitize portions of the SES to the occurrence of the post-condition state such that SPM data written to the sensitized portion of the SES are given a greater weight or activity. Each SPM may also be biased, based on the currently executing behavior from the DBAM, to give more weight to expected SPM signals.

For example, a currently executing behavior may have a post-condition state that expects to see a red object 45° to the left of the current heading. The attention agent would sensitize the vertices in the region surrounding the 45° left of current heading such that any SPM data written to those vertices are assigned an activity that is, for example, 50% higher than activities at the other vertices. Similarly, the SPM that detects red objects in the environment would write messages having an activity level that is, for example, 50% greater than the activity levels of other SPMs.

An event in the environment might stimulate several sensors simultaneously, but the messages from the various SPMs will be written to the SES at different times because of the varying delays (latencies) associated with each particular sensor. For example, finding a moving edge in an image sequence will take longer than detecting motion with an IR sensor array. A coincidence detection agent 240 may be trained to account for the varying sensor delays using training techniques known to one of skill in the art such that messages received by the SES within an interval of time are identified as responses to a single event.

In addition to the SPM data written to a vertex, a vertex may also contain links to behaviors stored in the DBAM 260. Landmark mapping agents may also write to the SES, storing a pointer to an object descriptor at the vertex where the object is expected. Objects may be tracked during robot movement on the SES using transformations such as those described in Peters, R. A. II, K. E. Hambuchen, K. Kawamura, and D. M. Wilkes, "The Sensory Ego-Sphere as a Short-Term Memory for Humanoids", *Proc. IEEE-RAS Int'l. Conf. on Humanoid Robots*, pp. 451-459, Waseda University, Tokyo, Japan, 22-24 Nov. 2001 herein incorporated by reference in its entirety.

The ability to place an expected object onto the SES and to track objects enables the robot to know what to expect and to remember and recall where objects it has passed should be. The ability to recall passed objects also enables the robot to backtrack to a previous state if a sudden event causes the robot to "get lost" in the sense that a sudden event may displace the state of the robot to a point far from the robot's active map prior to the event.

The ability to place an object onto the SES 220 provides the robot the capability for ego-centric navigation. The placement of three objects on the SES 220 allows the robot to triangulate its current position and the capability of placing the goal state on the SES allows the robot to calculate the goal with respect to its current position.

The objects placed in the SES 220 may also originate from sources external to the robot such as, for example, from another robot. This allows the robot to "know" the location of objects it cannot directly view.

The information written to the focus vertex is vector encoded to a current state vector and passed to the DBAM 260. The current state vector is used in the DBAM 260 to terminate or continue the currently executing behavior and to activate the succeeding behavior.

The actuator controls 270 are activated by executing behavior agents retrieved from the DBAM 260. Each behavior is stored as a record in the DBAM 260 and is executed by an independent behavior agent. When the robot is operating in an autonomous mode and performing a task, the currently executing behavior agent receives information from the SES 220. The currently executing behavior agent either continues executing the current behavior if the SES information corresponds to the state expected by the current behavior or terminates the current behavior if the SES information corresponds to the post-condition state of the current behavior. The currently executing behavior may also be terminated by a simple time-out criteria.

Upon identifying a termination condition, the succeeding behavior is selected by propagation of activation signals between the behaviors linked to the currently executing behavior. Restricting the search space to only the behaviors that are linked to the currently executing behavior, instead of all of the behaviors in the DBAM, significantly reduces the search time for the succeeding behavior such that real-time responsiveness is exhibited by the robot.

Each of the behaviors linked to the current behavior computes the vector-space distance between the current state and its own pre-condition state. Each behavior propagates an inhibitory signal (by adding a negative number to the activation term) that is inversely proportional to the computed distance to the other linked behaviors. The propagation of the inhibitory signal between the linked behaviors has the effect that, in most instances, the behavior with the highest activation term is also the behavior whose pre-condition state most closely matches the current state of the robot.

The links between behaviors are created by the SAN agent during task planning but may also be created by a dream agent during the dream state. The links are task dependent and different behaviors may be linked together depending on the assigned goal.

When the robot is tasked to achieve a goal, the spreading activation network (SAN) agent constructs a sequence of behaviors that will take the robot from its current state to the goal state (active map) in the DBAM by back-propagating from the goal state to the current state. For each behavior added to the active map, the SAN agent performs a search for behaviors that have a pre-condition state close to the post-condition state of the added behavior and adds a link connecting the close behavior to the added behavior. An activation term characterizing the link and based on the inverse vector space distance between the linked behaviors is also added to the added behavior. The SAN agent may create several paths connecting the current state to the goal state.

The command context agent enables the robot to receive a goal defined task and to transition the robot between active mode, dream mode, and training mode.

During periods of mechanical inactivity when not performing or learning a task or when the current task does not use the full processing capabilities of the robot (daydreaming?), the robot may transition to a dream state. While in the dream state, the robot modifies or creates new behaviors based on its most recent activities and creates new scenarios (behavior sequences never before executed by the robot) for possible execution during future activity.

Each time the robot dreams, the dream agent analyzes R(t) for the recent active period since the last dream state by identifying episode boundaries and episodes. Each recent episode is first compared to existing behaviors in the DBAM to confirm if the recent episode is another instance of the existing behavior. The comparison may be based on the average distance or end-point distances between the recent episode and the existing behavior or any other like criteria. If the episode is close to the behavior, the behavior may be modified to account for the new episode.

If the episode is distinct from the existing behaviors, the dream agent creates a new behavior based on the episode and finds and creates links to the nearest behaviors. The default activation link to the nearest existing behaviors may be based, in part, on the number of episodes represented in the exemplar behavior such that a new behavior generated from a single episode may be assigned a smaller activation value than behaviors generated from many episodes. The new behavior is added to the DBAM for possible future execution.

If a robot is limited to behavior sequences learned only through tele-operation or other known training techniques, the robot may not be able to respond to a new situation. In a preferred embodiment, a dream agent is activated during periods of mechanical inactivity and creates new plausible behavior sequences that may allow the robot, during its active state, to react purposefully and positively to contingencies never before experienced. The dream agent randomly selects a pairs of behaviors from the DBAM and computes the endpoint distances between the selected behaviors. The endpoint distances are the distances between the pre-condition state of one behavior and the post-condition state of the other behavior. The distance may be a vector distance or any appropriate measure known to one of skill in the art. If the computed distance is less than a cut-off distance, the preceding behavior (the behavior with the post-condition state close to the succeeding behavior's pre-condition state) is modified to include a link to the succeeding behavior.

The robots of Pfeifer and Cohen must be trained to identify episodes that lead to the accomplishment of a task. The training usually involves an external handler that observes and rewards robot behaviors that advance the robot through the completion of the task. The robot either makes a random move or a best estimate move and receives positive or negative feedback from the handler depending on whether the move advances the robot toward the goal. This move-feedback cycle must be repeated for each step toward the goal. The advantage of such a training program is that robot learns both actions that lead toward a goal and actions that do not accomplish a goal. The disadvantage of such a system is that the training time is very long because in addition to learning how to accomplish a task, the robot learns many more methods of not accomplishing a task.

A more efficient method of learning a task is to teach the robot only the tasks required to accomplish a goal. Instead of allowing the robot to make random moves, the robot is guided through the completion of the task by an external handler via tele-operation. During tele-operation, the handler controls all actions of the robot while the robot records the state (sensor and actuator information) of the robot during the tele-operation. The task is repeated several times under slightly different conditions to allow the formation of episode clusters for later analysis. After one or more training trials, the robot is placed in the dream state where the recorded state information is analyzed by the robot to identify episodes, episode boundaries, and to create exemplar episodes for each episode cluster.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. A system for processing signals received from a plurality of sensors and for producing signals to at least one actuator, said system comprising:
   a plurality of processors for processing sensor signals received from the sensors and producing output signals;
   a sensory database comprising a plurality of records, each record comprising an output signal received from at least one of the plurality of processors;
   a behavior database comprising a plurality of records, each record representing a behavior to be performed by an actuator;
   a first agent for identifying a most active portion of the sensory database; and
   a second agent for selecting a behavior from the behavior database and communicating it to an actuator, the selection based, in part, on identification of the most active portion of the sensory database.

2. The system of claim 1 further comprising a sensory agent for storing output signals into locations in the sensory database in accordance with the orientation of the sensors from which the signals derive.

3. The system of claim 2 wherein the sensory agent stores in the sensory database a datum representing a time stamp associated with the output signal.

4. The system of claim 3 further comprising a coincidence agent for detecting temporal coincidence of a first sensor signal and a second sensor signal when the first sensor signal time stamp does not equal the second sensor time stamp.

* * * * *